(12) United States Patent
Mikami et al.

(10) Patent No.: US 10,714,992 B2
(45) Date of Patent: *Jul. 14, 2020

(54) MOTOR INCLUDING PLURALITY OF ROTOR PARTS

(71) Applicant: DENSO CORPORATION, Aichi-ken (JP)

(72) Inventors: Koji Mikami, Kariya (JP); Yoji Yamada, Kariya (JP); Akihisa Hattori, Kariya (JP); Seiya Yokoyama, Kariya (JP)

(73) Assignee: DENSO CORPORATION, Aichi-ken (JP)

( * ) Notice: Subject to any disclaimer, the term of this patent is extended or adjusted under 35 U.S.C. 154(b) by 177 days.

This patent is subject to a terminal disclaimer.

(21) Appl. No.: 15/781,995

(22) PCT Filed: Dec. 16, 2016

(86) PCT No.: PCT/JP2016/087621
§ 371 (c)(1),
(2) Date: Jun. 6, 2018

(87) PCT Pub. No.: WO2017/110688
PCT Pub. Date: Jun. 29, 2017

(65) Prior Publication Data
US 2018/0367000 A1    Dec. 20, 2018

(30) Foreign Application Priority Data
Dec. 24, 2015  (JP) .................................. 2015-251811

(51) Int. Cl.
*H02K 1/27* (2006.01)
*H02K 1/18* (2006.01)
(Continued)

(52) U.S. Cl.
CPC .................. *H02K 1/18* (2013.01); *H02K 1/22* (2013.01); *H02K 1/27* (2013.01); *H02K 1/278* (2013.01);
(Continued)

(58) Field of Classification Search
CPC ........ H02K 1/27; H02K 1/2766; H02K 1/278; H02K 3/28; H02K 21/14
(Continued)

(56) References Cited

U.S. PATENT DOCUMENTS 4,918,831 A * 4/1990 Kliman .................. H02K 1/246
228/185
5,682,073 A    10/1997 Mizuno
(Continued)

FOREIGN PATENT DOCUMENTS

CN       102170212 A    8/2011
DE   102014208344 A1   11/2015
(Continued)

OTHER PUBLICATIONS

International Preliminary Report on Patentability for PCT/JP2016/087621 dated Jun. 26, 2018, 8 pages.
(Continued)

*Primary Examiner* — Jue Zhang
*Assistant Examiner* — David A. Singh
(74) *Attorney, Agent, or Firm* — Kilpatrick Townsend & Stockton LLP (57) ABSTRACT

A motor includes a stator including windings and a rotor. The windings include a first winding and a second winding connected in series. The rotor includes a plurality of rotor parts arranged in an axial direction. Each of the rotor parts includes a first magnet pole unit including a permanent magnet and a second magnet pole unit opposing the second winding at a rotational position of the rotor where the first (Continued)

magnet unit opposes the first winding. The second magnet pole unit applies a weaker magnetic force to the stator than the first magnet pole unit. The rotor parts each include an equal number of magnet poles. The first magnet pole units of the rotor parts are located at positions deviated from one another in a circumferential direction. The second magnet pole units of the rotor parts are located at positions deviated from one another in the circumferential direction.

7 Claims, 8 Drawing Sheets

(51) Int. Cl.
*H02K 21/16* (2006.01)
*H02K 1/22* (2006.01)
*H02K 21/14* (2006.01)
*H02K 3/28* (2006.01)

(52) U.S. Cl.
CPC .......... *H02K 1/2766* (2013.01); *H02K 21/16* (2013.01); *H02K 3/28* (2013.01); *H02K 21/14* (2013.01)

(58) Field of Classification Search
USPC .................................................. 310/179–210
See application file for complete search history.

(56) References Cited

U.S. PATENT DOCUMENTS

| | | | |
|---|---|---|---|
| 6,211,593 B1 | 4/2001 | Nashiki | |
| 6,271,616 B1 | 8/2001 | Akemakou | |
| 2001/0028201 A1* | 10/2001 | Miyashita | H02K 1/276 310/156.38 |
| 2008/0296994 A1* | 12/2008 | El-Refaie | H02K 1/246 310/216.004 |
| 2012/0001509 A1 | 1/2012 | Yamada et al. | |
| 2014/0062249 A1 | 3/2014 | Nagao et al. | |
| 2014/0265703 A1 | 9/2014 | Yamada et al. | |
| 2017/0244292 A1* | 8/2017 | Zhong | H02K 1/2706 |

FOREIGN PATENT DOCUMENTS

| | | |
|---|---|---|
| EP | 0620634 A1 | 10/1994 |
| EP | 2942858 A2 | 11/2015 |
| JP | 6-351206 A | 12/1994 |
| JP | 2002-209349 A | 7/2002 |
| JP | 2002-534047 A | 10/2002 |
| JP | 2006-25572 A | 1/2006 |
| JP | 2007-129869 A | 5/2007 |
| JP | 2010-094001 A | 4/2010 |
| JP | 2011-083066 A | 4/2011 |
| JP | 2012-034520 A | 2/2012 |
| JP | 2014-135852 A | 7/2014 |
| JP | 2015-095999 A | 5/2015 |
| JP | 2015-122957 A | 7/2015 |
| WO | 2017-110688 A1 | 6/2017 |

OTHER PUBLICATIONS

International Search Report for PCT/JP2016/087621 dated Feb. 28, 2017, 5 pages.

Office Action for Chinese Patent Application No. 201680069546 dated Sep. 3, 2019, all pages.

* cited by examiner

MOTOR INCLUDING PLURALITY OF ROTOR PARTS

TECHNICAL FIELD

The present invention relates to a motor.

BACKGROUND ART

In the prior art, as described in, for example, patent document 1, a permanent magnet motor such as a brushless motor includes a stator, which is formed by windings wound around a stator core, and a rotor, which uses permanent magnets opposing the stator as magnet poles. The windings of the stator are supplied with drive currents to generate a rotation field that rotates the rotor.

PRIOR ART DOCUMENT

Patent Document

Patent Document 1: Japanese Laid-Open Patent Publication No. 2014-135852

SUMMARY OF THE INVENTION

Problems that are to be Solved by the Invention

In a permanent magnet motor such as that described above, when the rotor is driven to rotate at a higher speed, an increase in flux linkage resulting from the permanent magnets of the rotor increases the induced voltage generated at the windings of the stator. The induced voltage lowers the motor output and hinders rotation of the rotor at a higher speed.

It is an object of the present invention to provide a motor that allows for rotation at a higher speed.

Means for Solving the Problem

To achieve the above object, a motor includes a stator including windings and a rotor rotated by a rotation field generated when drive currents are supplied to the windings. The windings include a first winding and a second winding connected in series, in which the first winding and the second winding are synchronously excited by the drive currents. The rotor includes a plurality of rotor parts arranged next to each other in an axial direction. Each of the rotor parts includes a magnet pole including a permanent magnet and a flux toleration portion. The flux toleration portion opposes the second winding at a rotational position of the rotor where the magnet pole opposes the first winding. The flux toleration portion tolerates generation of a flux linkage resulting from a field weakening current at the second winding. The rotor parts each include an equal number of the magnet poles. The magnet poles of the rotor parts are located at positions deviated from each other in a circumferential direction.

In this structure, each rotor part includes the flux toleration portion that opposes the second winding at a rotational position where the magnet pole opposes the first winding. The flux toleration portion tolerates generation of a flux linkage resulting from a field weakening current (d-axis current) at the second winding. This facilitates the generation of the flux linkage (field weakening flux) resulting from the field weakening current generated at the windings. Thus, the effect of reducing the induced voltage resulting from the field weakening flux is obtained in a further optimal manner. This allows the motor to be rotated at a higher speed in a further optimal manner.

To achieve the above object, a motor includes a stator including windings and a rotor rotated by a rotation field generated when drive currents are supplied to the windings. The windings include a first winding and a second winding connected in series, in which the first winding and the second winding are synchronously excited by the drive currents. The rotor includes a plurality of rotor parts arranged next to one another in an axial direction. Each of the rotor parts includes a first magnet pole unit including a permanent magnet and a second magnet pole unit opposing the second winding at a rotational position of the rotor where the first magnet unit opposes the first winding. The second magnet pole unit applies a weaker magnetic force to the stator than the first magnet pole unit. The rotor parts each include an equal number of magnet poles. The first magnet pole units of the rotor parts are located at positions deviated from one another in a circumferential direction. The second magnet pole units of the rotor parts are located at positions deviated from one another in the circumferential direction.

In this structure, the first magnetic pole unit and the second magnetic pole unit of each rotor part are respectively opposed at a predetermined rotational position to the first winding and the second winding that are synchronously excited. The second magnet pole unit applies a weaker magnetic force to the stator than the first magnet pole unit. This facilitates the generation of the flux linkage (field weakening flux) resulting from the field weakening current generated at the windings. Thus, the effect of reducing the induced voltage resulting from the field weakening flux is obtained in a further optimal manner. This allows the motor to be rotated at a higher speed in a further optimal manner.

EMBODIMENTS OF THE INVENTION

One embodiment of a motor will now be described.

Figure 1A:
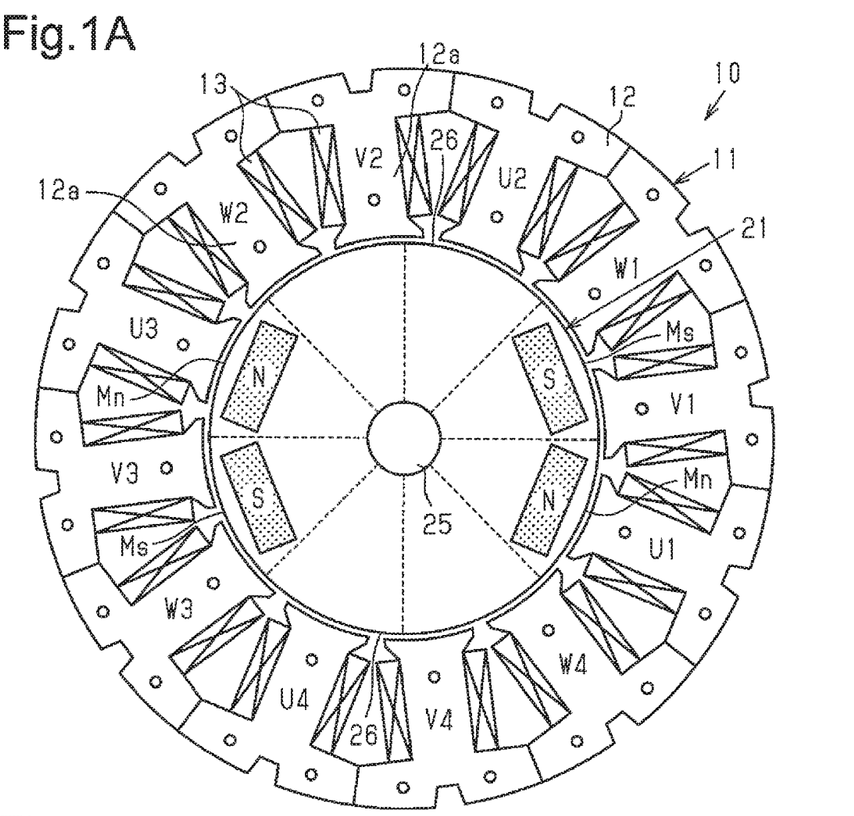
FIG. 1A is a plan view showing a motor according to one embodiment of the present invention.

As shown in FIG. 1A, a motor 10 of the present embodiment is configured as a brushless motor and includes an annular stator 11 and a rotor 21 arranged at an inner side of the stator 11.

Structure of Stator

The stator 11 includes a stator core 12 and windings 13 wound around the stator core 12. The stator core 12 is substantially ring-shaped and formed from a magnetic metal. The stator core 12 includes twelve teeth 12a extending inward and arranged in the radial direction at equal angular intervals in the circumferential direction.

There are twelve windings 13, the number of which is the same as the teeth 12a. The twelve windings 13 are wound as concentrated windings in the same direction around the teeth 12a, respectively. That is, the twelve windings 13 are arranged in the circumferential direction at equal intervals (30-degree intervals). The windings 13 are classified into three phases in accordance with the supplied drive currents of three phases (U-phase, V-phase, and W-phase) and indicated in order in the counterclockwise direction as U1, V1, W1, U2, V2, W2, U3, V3, W3, U4, V4, and W4 in FIG. 1A.

With regard to each phase, the U-phase windings U1 to U4 are arranged in the circumferential direction at equal intervals (90-degree intervals). In the same manner, the V-phase windings V1 to V4 are arranged in the circumferential direction at equal intervals (90-degree intervals). The W-phase windings W1 to W4 are also arranged in the circumferential direction at equal intervals (90-degree intervals).

Figure 3:
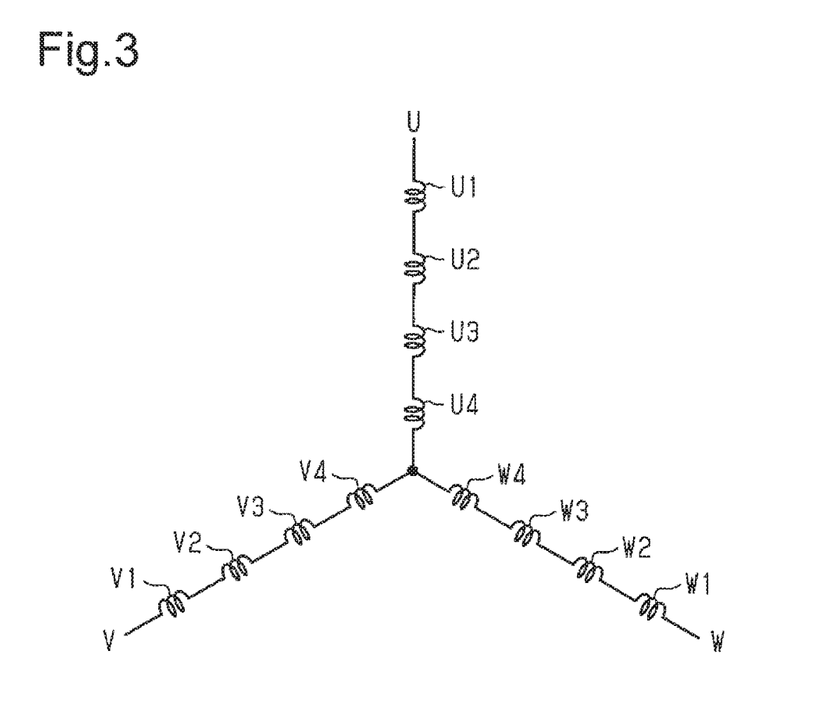
FIG. 3 is an electric circuit diagram showing the connection of windings shown in FIG. 1A.

As shown in FIG. 3, the windings 13 in each phase are connected in series. That is, the U-phase windings U1 to U4, the V-phase windings V1 to V4, and the W-phase windings W1 to W4 respectively form series circuits. In the present embodiment, the series circuit of the U-phase windings U1 to U4, the series circuit of the V-phase windings V1 to V4, and the series circuit of the W-phase windings W1 to W4 are in a star connection.

Structure of Rotor

Figure 2A:
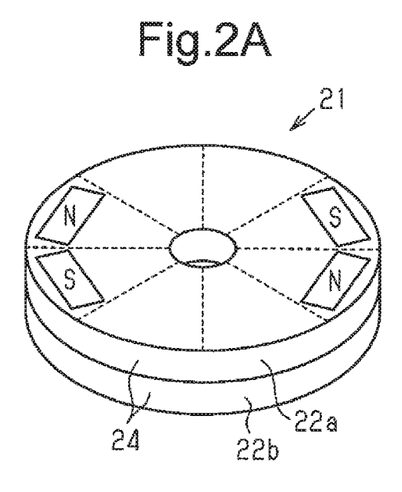
FIG. 2A is a perspective view showing the rotor of FIG. 1A.
Figure 2B:
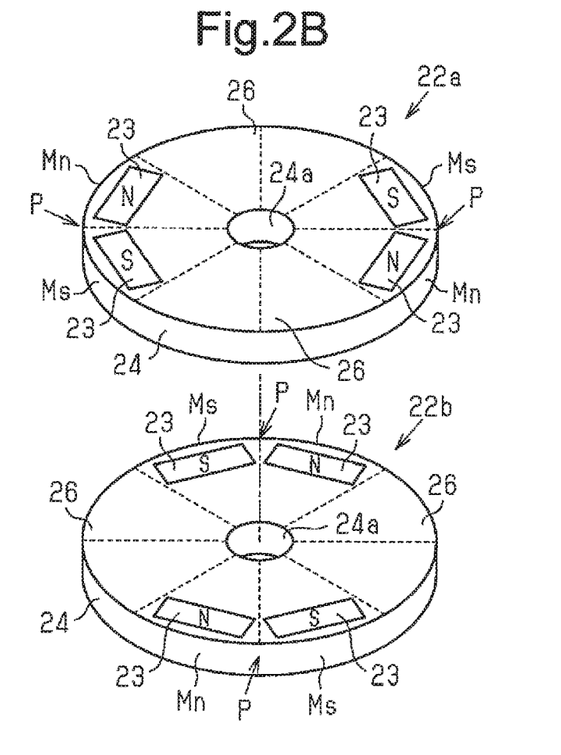
FIG. 2B is an exploded perspective view showing the rotor of FIG. 2A.

As shown in FIGS. 2A and 2B, the rotor 21 is formed by stacking two rotor parts (first rotor part 22a and second rotor part 22b) in an axial direction. The rotor parts 22a and 22b are identical in shape and structure and are stacked so that the position of the rotor part 22a in the circumferential direction is deviated from that of the rotor part 22b.

The structure of the first rotor part 22a will now be described with reference to FIG. 1B. The second rotor part 22b has the same structure as the first rotor part 22a. Thus, like or same reference numerals are given to those components that are the same as the first rotor part 22a. Such components will not be described in detail.

Figure 1B:
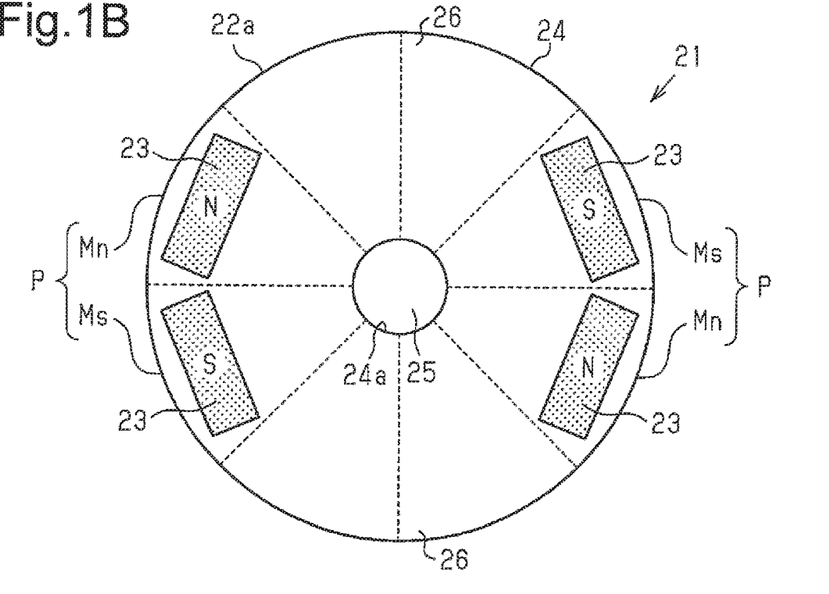
FIG. 1B is a plan view showing a rotor of FIG. 1A.

As shown in FIG. 1B, the rotor part 22a of the present embodiment has an interior permanent magnet structure (IPM structure) in which permanent magnets 23 forming magnet poles are embedded in a rotor core 24. The rotor core 24 is disk-shaped and formed from a magnetic metal. The central portion of the rotor core 24 includes a fixing hole 24a into which a rotation shaft 25 is inserted and fixed.

The rotor part 22a includes portions with the permanent magnets 23 embedded in the rotor core 24 to form magnet poles and portions (non-magnetic portions 26) without permanent magnets so as not to form magnet poles.

More specifically, the rotor part 22a includes N-magnet poles Mn and S-magnet poles Ms, each including a permanent magnet 23. The permanent magnet 23 of each of the magnet poles Mn and Ms is formed so that the magnetic orientations are directed in the radial direction. In further detail, the permanent magnet 23 of each N-magnet pole Mn is magnetized so that the magnet pole formed at the outer circumferential side is the N-pole, and the permanent magnet 23 of each S-magnet pole Ms is magnetized so that the magnet pole formed at the outer circumferential side is the S-pole.

Further, each permanent magnet 23 is, for example, an anisotropic sintered magnet and is configured by, for example, neodymium magnet, samarium-cobalt (SmCo) magnet, SmFeN magnet, ferrite magnet, alnico magnet, or the like. Each permanent magnet 23 of the present embodiment is rectangular in an axial view. Each permanent magnet 23 includes a long side surface (radially inner surface) as viewed in the axial direction that is orthogonal to the radial direction of the rotor 21.

The N-magnet pole Mn and the S-magnet pole Ms are arranged adjacent to each other so that their magnet pole centers are arranged at an interval of 45 degrees in the circumferential direction. Each pair of the N-magnet pole Mn and the S-magnet pole Ms arranged adjacent to each other is referred to as the magnet pole pair P. In the rotor part 22a of the present embodiment, two magnet pole pairs P are arranged in the circumferential direction at 180-degree opposing positions. In further detail, the N-magnet pole Mn of one of the two magnet pole pairs P and the N-magnet pole Mn of the other one of the two magnet pole pairs P are arranged in the circumferential direction at 180-degree opposing positions. In the same manner, the S-magnet pole Ms of one of the two magnet pole pairs P and the S-magnet pole Ms of the other one of the two magnet pole pairs P are arranged in the circumferential direction at 180-degree opposing positions.

In addition, the open angle (occupied angle) of each of the magnet poles Mn and Ms in the circumferential direction of the rotor part 22a is set to $(360/2n)°$, where n represents the total number of the magnet poles Mn and Ms (total number of permanent magnets 23). In the present embodiment, the total number of the magnet poles Mn and Ms is four. Thus, the open angle of each of the magnet poles Mn and Ms is set to 45°. That is, the open angle of the magnet pole pair P of the adjacent magnet poles Mn and Ms is 90°.

In the rotor part 22a having the above structure, portions of the rotor core 24 located between the magnet pole pairs P in the circumferential direction define the non-magnetic portions 26 without permanent magnets so as not to form magnet poles. That is, the rotor core 24 includes two magnet pole pairs P and two non-magnetic portions 26 that are alternately arranged every 90 degrees in the circumferential direction. Further, each non-magnetic portion 26 of the rotor core 24 is configured so that one side in the circumferential direction is adjacent to the N-magnet pole Mn and the other side in the circumferential direction is adjacent to the S-magnet pole Ms.

As shown in FIGS. 2A and 2B, the first and second rotor parts 22a and 22b having the above structures are stacked in a manner deviated from each other by a predetermined deviation angle θ in the circumferential direction. The deviation angle θ of the rotor parts 22a and 22b in the circumferential direction is set to $360/(m \times t)(°)$, where m represents the number of the rotors 22a and 22b arranged next to one another in the axial direction and t represents the number of the magnet pole pairs P in each of the rotors 22a and 22b. In the present embodiment, the number of the rotors 22a and 22b and the number of the magnet pole pairs P of each of the rotors 22a and 22b are both two. Thus, the deviation angle θ is set to 90°. That is, the circumferential center of each magnet pole pair P of the first rotor part 22a (or circumferential center of each non-magnetic portion 26) is deviated by 90° in the circumferential direction from the circumferential center of each magnet pole pair P of the second rotor part 22b (or circumferential center of each non-magnetic portion 26).

The operation of the present embodiment will now be described.

A drive circuit (not shown) supplies drive currents (AC) of three phases having phase differences of 120° to the U-phase windings U1 to U4, the V-phase windings V1 to V4, and the W-phase windings W1 to W4, respectively. Thus, in the windings U1 to W4, those of the same phase are synchronously excited. This generates a rotation field in the stator 11. The rotation field rotates the rotor 21. The supply of the three-phase drive currents forms poles in the stator 11 so that those having the same phases in the windings U1 to W4 have the same polarity. In the present embodiment, the number of the magnet poles of the rotor 21 (number of magnet poles Mn and Ms) is four. However, in the windings U1 to W4, those of each phase are supplied with drive current set assuming that the number of poles of the rotor 21 (number of poles of each of the rotors 22a and 22b) is two times the number of the magnet poles Mn and Ms (eight poles in the present embodiment).

During high-speed rotation of the rotor 21, field weakening control is executed to supply the windings 13 with field weakening current (d-axis current). During high-speed rotation of the rotor 21 (during field weakening control), for example, as shown in FIG. 1A, when the N-magnet poles Mn of the first rotor part 22a radially oppose the U-phase windings U1 and U3, the two non-magnetic portions 26 of the first rotor parts 22a radially oppose the U-phase windings U2 and U4. Further, the N-magnet poles Mn of the second rotor part 22b oppose the U-phase windings U2 and U4, and the two non-magnetic portions 26 of the second rotor part 22b radially oppose the U-phase windings U1 and U3.

In this case, the U-phase windings U1 to U4 are each supplied with a field weakening current, and the U-phase windings U2 and U4 radially oppose the non-magnetic portions 26 of the first rotor part 22a, respectively. This allows for smooth passage of a flux linkage (field weakening flux), which is generated at the U-phase windings U2 and U4 by the field weakening current, through the rotor 21. Further, the U-phase windings U1 and U3 radially oppose the non-magnetic portions 26 of the second rotor part 22b, respectively. This allows for smooth passage of field weakening flux, which is generated at the U-phase windings U1 and U3, through the rotor 21. Thus, field weakening flux is easily generated at each of the U-phase windings U1 to U4. Accordingly, the effect of reducing the induced voltage (inverse voltage) resulting from the field weakening flux is obtained in a further optimal manner. As a result, the motor 10 is rotated at a higher speed in a further optimal manner.

The effect described above also occurs in the windings opposing the S-magnet poles Ms. An example using the induced voltage of the U-phase windings U1 to U4 has been described above. The effect of reducing the induced voltage by arranging the non-magnetic portions 26 at the rotors 22a and 22b is also obtained in the V-phase windings V1 to V4 and the W-phase windings W1 to W4.

As described above, each of the rotors 22a and 22b includes the magnet poles Mn and Ms and the non-magnetic portions 26 in the circumferential direction.

As a comparative example of the rotor, for example, in a structure including only one rotor part (e.g., only first rotor part 22a), the magnet poles Mn and Ms producing compelling force (induction) of flux and the non-magnetic portions 26 that do not produce compelling force of flux are mixed in the circumferential direction of the rotor. Thus, radial force that acts on the rotor in the radial direction is unbalanced in the circumferential direction. This increases vibration.

In the rotor 21 of the present embodiment, the first and second rotor parts 22a and 22b each including the magnet poles Mn and Ms and the non-magnetic portions 26 are arranged next to each other in the axial direction, and the magnet poles Mn and Ms of the first and second rotor parts 22a and 22b are deviated from each other in the circumferential direction (refer to FIGS. 2A and 2B). This distributes the radial force produced in the rotor 21 in the circumferential direction and thus limits vibration of the rotor 21.

Additionally, in the present embodiment, the deviation angle θ of the rotor parts 22a and 22b in the circumferential direction is set to 360/(m×t)=90(°), where m represents the number of the rotor parts 22a and 22b (two in the present embodiment) and t represents the number of the magnet pole pairs P in each of the rotors 22a and 22b (two in the present embodiment). Thus, when the rotor 21 including the rotor parts 22a and 22b is viewed as a whole, the magnet pole pairs P are arranged at equal intervals in the circumferential direction. This distributes the radial force produced in the rotor 21 in the circumferential direction in a well-balanced manner and further limits vibration of the rotor 21.

The present embodiment has the advantages described below.

(1) In correspondence with the supplied drive currents of three phases, the windings 13 of the stator 11 include the four U-phase windings U1 to U4, the four V-phase windings V1 to V4, and the four W-phase windings W1 to W4. The four windings of each phase are connected in series. That is, the windings 13 of the stator 11 include at least two series-connected windings (first winding and second winding) for each phase.

The rotor 21 includes the first and second rotor parts 22a and 22b stacked in the axial direction. The rotor parts 22a and 22b each include the magnet poles Mn and Ms and the non-magnetic portions 26 (flux toleration portion) of the rotor core 24. The magnet poles Mn and Ms each include the permanent magnet 23. The non-magnetic portions 26 oppose, for example, the U-phase windings U2 and U4 at a rotational position where the magnetic magnet pole Mn (or magnet pole Ms) opposes the U-phase windings U1 and U3. In each of the rotor parts 22a and 22b, the non-magnetic portions 26 of the rotor core 24 tolerate generation of a flux linkage resulting from a field weakening current at the opposing windings 13. This facilitates the generation of the field weakening flux at each winding 13. Thus, the effect of reducing the induced voltage resulting from the field weakening flux is obtained in a further optimal manner. This allows the motor 10 to be rotated at a higher speed in a further optimal manner.

In addition, a field weakening flux is easily generated at each winding 13 as described above. This reduces the field weakening current supplied to the windings 13. The reduced field weakening current limits demagnetization of the permanent magnets 23 during field weakening control and limits copper loss of the windings 13. In other words, the flux linkage amount that can be reduced by the same amount of field weakening current increases. This allows the field weakening control to further effectively increase the rotation speed.

(2) The rotor 21 is formed by arranging the first and second rotor parts 22a and 22b next to one another in the axial direction so that the positions of the magnet poles Mn and Ms in the rotor part 22a are deviated in the circumferential direction from the positions of the magnet poles Mn and Ms in the rotor part 22b. Thus, the radial force produced in the entire rotor 21 including the rotor parts 22a and 22b, which are arranged next to one another, is distributed in the circumferential direction. This limits vibration of the rotor 21.

(3) In each of the rotor parts 22a and 22b, a plurality of (two sets of) the magnet pole pairs P, each including the N-magnet pole Mn and the S-magnet pole Ms arranged adjacent to each other in the circumferential direction, are arranged at equal intervals in the circumferential direction. This allows the structure of each of the rotors 22a and 22b to be mechanically well-balanced.

(4) The deviation angle θ of the rotor parts 22a and 22b in the circumferential direction is set to 360/(m×t)(°), where m represents the total number of the rotor parts 22a and 22b arranged next to one another in the axial direction and t represents the number of the magnet pole pairs P of each of the rotor parts 22a and 22b. In this structure, when the rotor 21 is viewed as a whole, the magnet pole pairs P are arranged at equal intervals in the circumferential direction. Thus, the radial force generated in the rotor 21 is distributed in the circumferential direction in a well-balanced manner. This further limits vibration of the rotor 21.

The above embodiment may be modified as described below.

In the above embodiment, the deviation angle θ of the rotor parts 22a and 22b in the circumferential direction is set to 90°. However, there is no such limitation, and the deviation angle θ may be set to less than 90°.

In the rotor 21 of the above embodiment, the number of the rotor parts 22a and 22b arranged next to one another in the axial direction is two. However, there is no such limitation, and the number of the rotor parts 22a and 22b may be three or more.

In the above embodiment, the first rotor part 22a and the second rotor part 22b are stacked so as to abut against each other in the axial direction. Instead, a non-magnetic layer may be arranged between the first rotor part 22a and the second rotor part 22b in the axial direction. For example, in the structure shown in FIGS. 4A and 4B, a non-magnetic member 31 serving as a non-magnetic layer is arranged between the first rotor part 22a and the second rotor part 22b in the axial direction. The non-magnetic member 31 is formed from, for example, a resin material. With this structure, the non-magnetic member 31 reduces short-circuit flux between the rotor parts 22a and 22b and thus limits decreases in effective flux that contributes to the rotation output of the rotor 21.

Figure 4A:
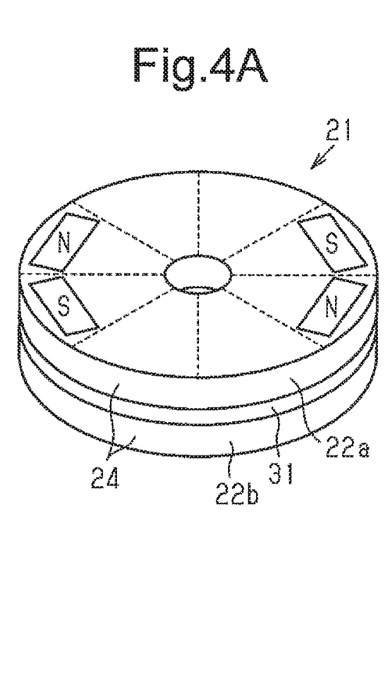
FIG. 4A is a perspective view showing a further example of a rotor.
Figure 4B:
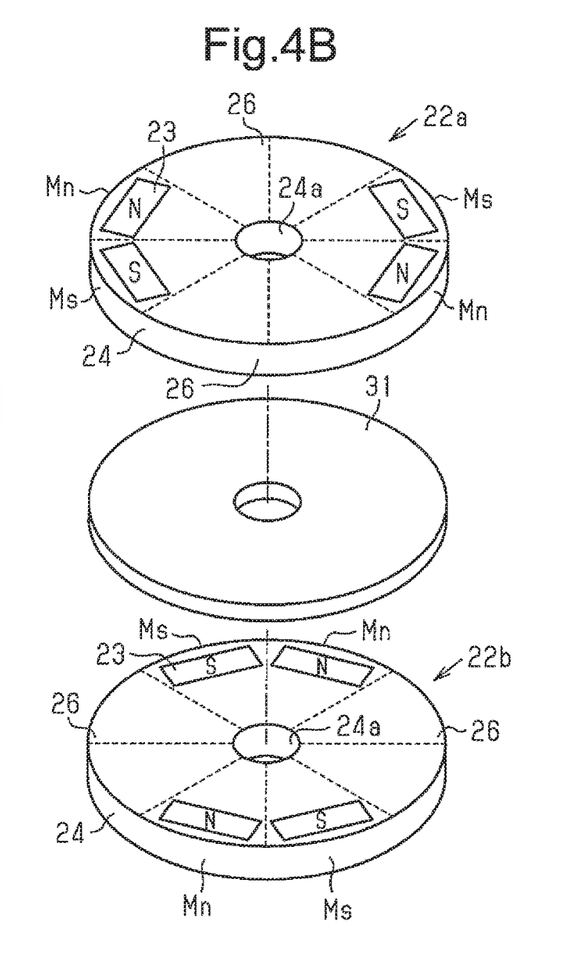
FIG. 4B is an exploded perspective view showing the rotor of the further example.

In the example shown in FIGS. 4A and 4B, the non-magnetic member 31 is circular, and its outer diameter is equal to the outer diameter of each of the rotor parts 22a and 22b (outer diameter of rotor core 24). However, the structure such as the shape of the non-magnetic member 31 is not particularly limited. In addition, the form of the non-magnetic layer is not limited to the non-magnetic member 31. Instead, a gap serving as a non-magnetic layer may be arranged between the first rotor part 22a and the second rotor part 22b in the axial direction.

In each of the rotors 22a and 22b of the above embodiment, the same polarities of the magnet poles Mn and Ms (permanent magnets 23) are arranged at 180-degree opposing positions. However, there is no limit to such an arrangement.

Figure 5:
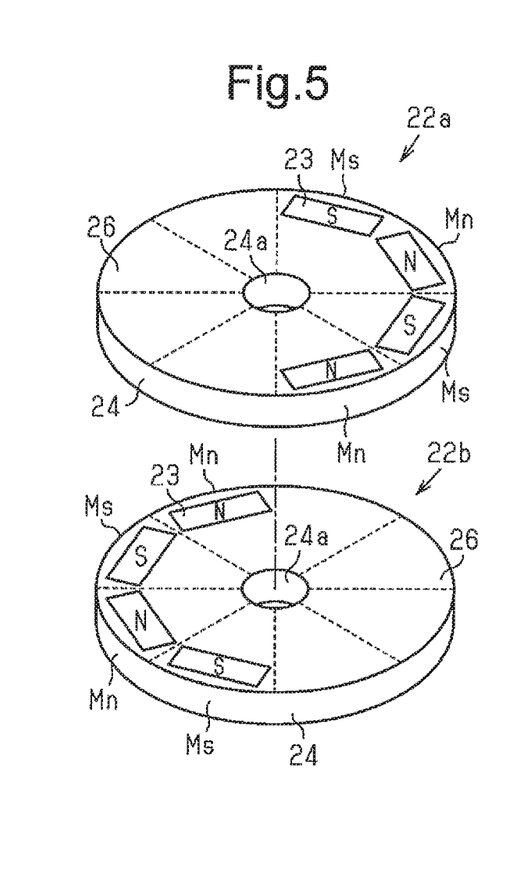
FIG. 5 is an exploded perspective view showing a further example of a rotor.

For example, as shown in FIG. 5, the N-magnet poles Mn and the S-magnet poles Ms (permanent magnets 23) may be alternately arranged on one half of the circumference of the rotor core 24, and the other half of the circumference of the rotor core 24 may be configured as the non-magnetic portion 26. Such a structure also obtains the same advantage as advantage (1) of the above embodiment. Further, in each of the rotors 22a and 22b shown in FIG. 5, the deviation angle of the rotor parts 22a and 22b in the circumferential direction is 180°. When the rotor 21 is viewed as a whole, the magnet poles Mn and Ms are arranged at equal intervals in the circumferential direction. This allows the radial force produced in the rotor 21 to be distributed in the circumferential direction in a well-balanced manner and further limits vibration of the rotor 21.

In the above embodiment, each of the rotor parts 22a and 22b has an interior permanent magnet structure (IPM structure) in which the permanent magnets 23 forming the magnet poles Mn and Ms are embedded in the rotor core 24. Instead, for example, as shown in FIG. 6, the rotor parts 22a and 22b may have a surface permanent magnetic structure (SPM structure) in which a plurality of permanent magnets 32, each forming the magnet poles Mn and Ms, are fixed to the outer circumferential surface of the rotor core 24.

Figure 6:
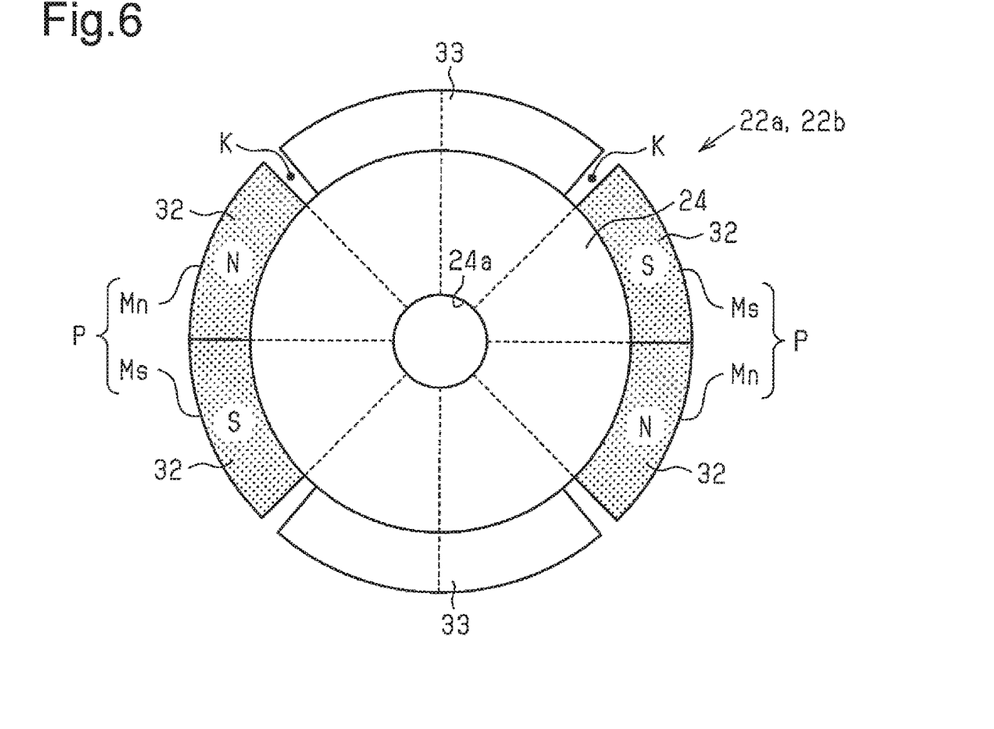
FIG. 6 is a plan view showing a further example of a rotor part.

In each of the rotor parts 22a and 22b shown in FIG. 6, the permanent magnets 32 are identical in shape, and the outer circumferential surface of each permanent magnet 32 is arcuate and extends about the center axis. The arrangement of the magnet poles Mn and Ms, each including the permanent magnet 32, is the same as the magnet poles Mn and Ms of the above embodiment.

Further, the open angle of the permanent magnets 32 in the circumferential direction is set to (360/2n)°, where n represents the total number of the magnet poles Mn and Ms (number of permanent magnets 32). In this example, the total number of the magnet poles Mn and Ms is four. Thus, the open angle of each permanent magnet 32 is set to 45°. Further, the open angle of each magnet pole pair P including the magnet poles Mn and Ms arranged adjacent to each other in the circumferential direction is set to 90° in correspondence with the two permanent magnets 32.

In addition, the rotor core 24 of this example includes two projections 33 that respectively correspond to the two non-magnetic portions 26 of the above embodiment. Each projection 33 of the rotor core 24 is formed projecting outward in the radial direction between the magnet pole pairs P in the circumferential direction. In other words, each projection 33 is configured so that one side in the circumferential direction is adjacent to an N-pole permanent magnet 32 and the other side in the circumferential direction is adjacent to an S-pole permanent magnet 32. Further, the outer circumferential surface of each projection 33 is arcuate about the center axis of the rotor, and the outer circumferential surfaces of the projections 33 are flush with the outer circumferential surfaces of the permanent magnets 32 (that is, arranged on the same circumference).

The two circumferential ends of each projection 33 are spaced apart by gaps K from the adjacent permanent magnets 32. The open angle of each projection 33 in the circumferential direction is set to be smaller than the open angle of each magnet pole pair P (90°) by an amount corresponding to the gaps K.

With such a structure, the projections 33 of the rotor core 24 of the rotor parts 22a and 22b also function as the flux toleration portions in the same manner as the non-magnetic portions 26 of the above embodiment. This obtains substantially the same advantages as the above embodiment. Vibration of the rotor 21 is limited in the same manner as the above embodiment by deviating the rotor parts 22a and 22b having the above structure from each other in the circumferential direction and arranging the rotor parts 22a and 22b next to each other in the axial direction.

In the structure shown in FIG. 6, the projections 33 project from the rotor core 24 between the magnet pole pairs P in the circumferential direction. However, for example, the projections 33 of this example may be omitted from the rotor core 24, that is, the rotor core 24 may have a circular contour in an axial view. In this structure, portions defined by the outer circumferential surface of the rotor core 24 where the permanent magnets 32 are not fixed (exposed surfaces) function as the flux toleration portions. Such a structure also obtains substantially the same advantages as the above embodiment.

In each of the rotor parts 22a and 22b, the structure such as the shape of each permanent magnet 23 embedded in the rotor core 24 is not limited to the above embodiment. Instead, for example, each permanent magnet 23 may have the structure shown in FIG. 7.

Figure 7:
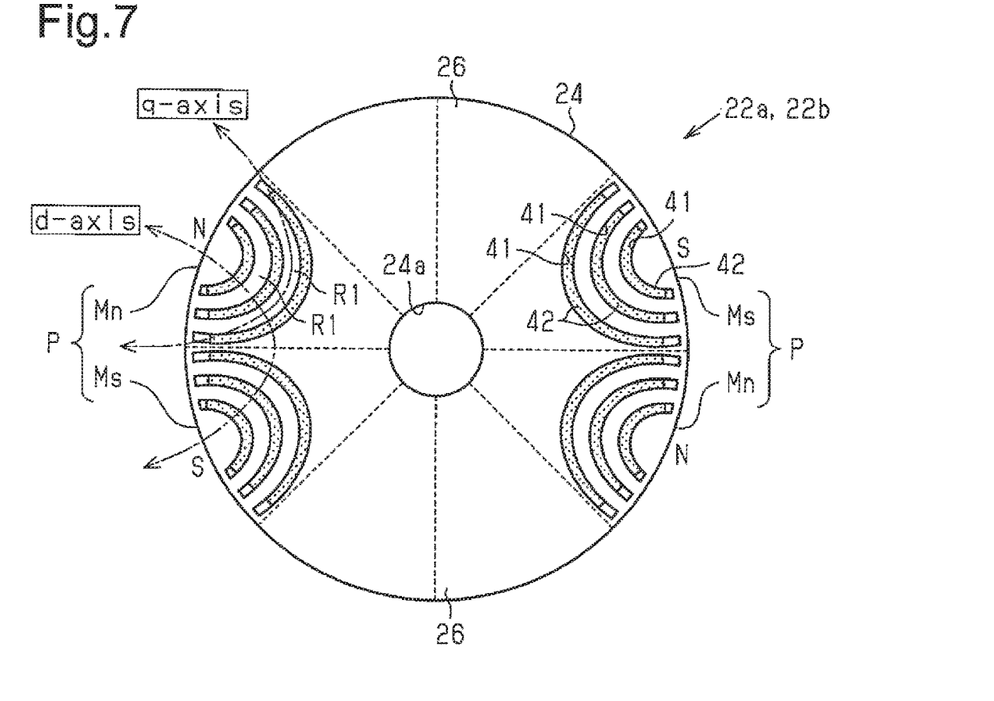
FIG. 7 is a plan view showing a further example of a rotor part.

FIG. 7 shows an example in which the magnet poles Mn and Ms of each of the rotor parts 22a and 22b include magnet receptacles 41 formed in the rotor core 24. Permanent magnets 42 are received in and fixed to the magnet receptacles 41. The magnet poles Mn and Ms each include three magnet receptacles 41 arranged next to one another in the radial direction, with each magnet receptacle 41 accommodating a permanent magnet 42. Each magnet receptacle 41 has a curved form and is bulged toward the center axis of the rotor 21 as viewed in the axial direction. Further, each magnet receptacle 41 has a curved form in which the center position in the circumferential direction of the magnet poles Mn and Ms is the closest to the center axis of the rotor. The permanent magnet 42 arranged in each magnet receptacle 41 also has a curved form that is in conformance with the form of the magnet receptacle 41. Each permanent magnet 42 in the N-magnet poles Mn is magnetized so that the inner side of the curve (radially outer side of rotor) functions as the N-pole, and each permanent magnet 42 in the S-magnet poles Ms is magnetized so that the inner side of the curve (radially outer side of rotor) functions as the S-pole. In the structure shown in FIG. 7, the number of the magnet receptacles 41 (permanent magnets 42) arranged next to one another in the radial direction in each of the magnet poles Mn and Ms is three. However, the number may be two, four, or greater than four.

With this structure, in each of the magnet poles Mn and Ms, portions of the rotor core 24 between the magnet receptacles 41 (inter-receptacle portion R1) form q-axis magnetic paths. This sufficiently increases the q-axis inductance. Further, in d-axis magnetic paths, the magnet receptacles 41 (and permanent magnets 42) produce magnetic resistance that sufficiently decreases the d-axis inductance. This increases the difference between the q-axis inductance and the d-axis inductance (salient-pole ratio). Thus, the reluctance torque can be increased, and the torque can be further increased.

In the structure of FIG. 7, preferably, the permanent magnets 42 are, for example, configured by, for example, neodymium magnets, samarium-cobalt (SmCo) magnets, SmFeN magnets, ferrite magnets, alnico magnets, or the like. Further, the permanent magnets 42 arranged next to one another in the radial direction in each of the magnet poles Mn and Ms preferably have different magnetic properties (magnetic coercive force or residual flux density). For example, in order to limit demagnetization, a large magnetic coercive force can be set for the permanent magnet 42 located closer to the outer circumference (radially outer side of rotor) that is apt to being affected by external magnetic fields. In contrast, a small magnetic coercive force (or large residual flux density) can be set for the permanent magnet 42 located closer to the inner circumference (radially inner side of rotor) since the effect of external magnetic fields is limited. Accordingly, for the permanent magnets 42 arranged next to one another in the radial direction, it is preferred that a larger magnetic coercive force be set for those located closer to the outer circumference.

In the example of FIG. 7, each magnet receptacle 41 includes a single permanent magnet 42. However, for example, the permanent magnet 42 received in each magnet receptacle 41 may be divided into a plurality of segments in the circumferential direction. This structure reduces the size of each permanent magnet 42 and facilitates the formation of each permanent magnet 42.

Figure 8:
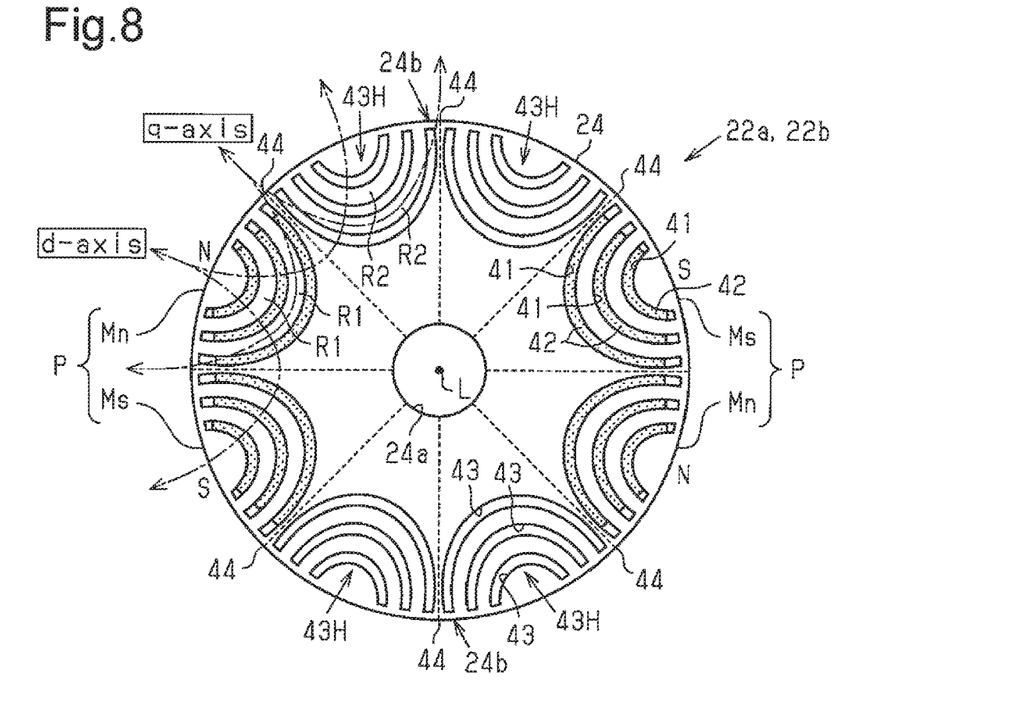
FIG. 8 is a plan view showing a further example of a rotor part.

As shown in FIG. 8, slits 43 may be formed in the rotor core 24 at portions located between the magnet pole pairs P in the circumferential direction (flux toleration portions 24b) so that the flux rectifying effect of the slits 43 result in the flux toleration portions 24b acting as salient-poles 44.

In the structure of FIG. 8, the occupied angle of the two magnet pole pairs P is substantially 180° in the circumferential direction of each of the rotor parts 22a and 22b, and the remaining range functions as the flux toleration portions 24b where magnets are not arranged. More specifically, the rotor core 24 includes two magnet pole pairs P and two flux toleration portions 24b that are alternately arranged in the circumferential direction at intervals of substantially 90°. The magnet layout in each of the magnet poles Mn and Ms is the same as the structure shown in FIG. 7.

Each flux toleration portion 24b includes two slit groups 43H, each formed by a plurality of (three in the example of FIG. 8) slits 43 arranged next to one another in the radial direction. The slits 43 of each slit group 43H are each curved and bulged toward the center of the rotor 21 (axis L) as viewed in the axial direction. In the example shown in FIG. 8, the slits 43 of each slit group 43H are identical in shape to the magnet receptacles 41 in each of the magnet poles Mn and Ms. Further, each slit group 43H is formed so that the peaks (portion closest to axis L in axial view) of the curves of the slits 43 are aligned in the radial direction of the rotor 21. The circumferential center (curve peak) of each slit group 43H and the circumferential center of each of the magnet poles Mn and Ms are located at equal intervals in the circumferential direction (equal intervals of 45° in illustrated example). In the structure shown in FIG. 8, the number of the slits 43 in each slit group 43H is three but instead may be two, four, or greater than four.

With such a structure, portions of the rotor core 24 between the slits 43 (inter-slit portions R2) form q-axis magnetic paths. This sufficiently increases the q-axis inductance. Further, in d-axis magnetic paths, the slits 43 produce magnetic resistance that sufficiently decreases the d-axis inductance. Accordingly, the difference between the q-axis inductance and the d-axis inductance (salient-pole ratio) can be increased. This produces the salient-poles 44 at the circumferentially center position of each flux toleration portion 24b (i.e., center position between slit groups 43H that are adjacent to each other in circumferential direction)

and at the circumferentially center position between each slit group 43H and the adjacent one of the magnet poles Mn and Ms (magnet receptacles 41) in the circumferential direction. Thus, reluctance torque can be obtained at each of the salient-poles 44, and the torque can be further increased. The flux rectifying effect of the slits 43 in the rotor core 24 results in the salient-poles 44 acting as poles. The salient-poles 44 are not magnet poles of permanent magnets. Thus, even though the flux toleration portions 24b include the salient-poles 44, the flux toleration portions 24b function to tolerate the flux linkage generated by a field weakening current.

In the example shown in FIG. 8, the magnet poles Mn and Ms have a magnet structure that conforms to the structure shown in FIG. 7 but instead may have a structure (IPM structure) like that of the above embodiment or a structure (SPM structure) like that shown in FIG. 6.

In each of the rotor parts 22a and 22b having the structure shown in the above embodiment and FIGS. 6, 7, and the like, each non-magnetic portion 26 is hardly affected by the fields of the magnet poles Mn and Ms (permanent magnet 23) that are adjacent in the circumferential direction (that is, do not become a magnet pole). However, there is no limit to such an arrangement.

Figure 9:
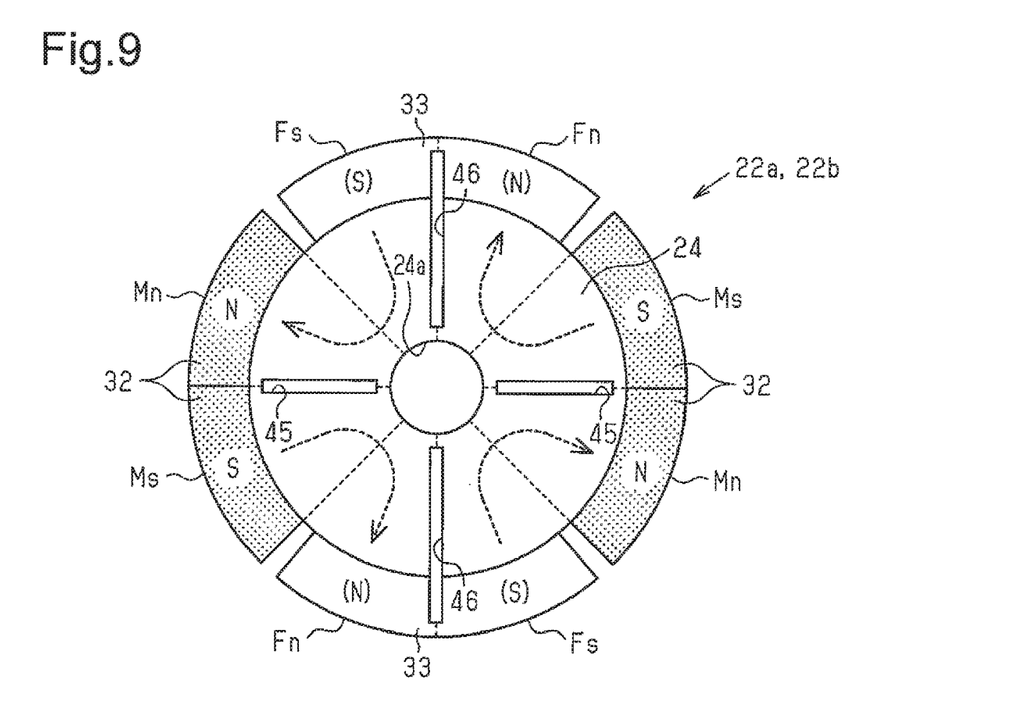
FIG. 9 is a plan view showing a further example of a rotor part.

For example, FIG. 9 shows a structure in which a plurality of slit holes 45 and 46 extending in the radial direction are formed in the rotor core 24 of each of the rotor parts 22a and 22b, which is shown in FIG. 6, in the circumferential direction at equal intervals (90-degree intervals). The slit holes 45 are each arranged at the boundary of the magnet poles Mn and Mn that are adjacent in the circumferential direction. Each slit hole 45 extends in the radial direction from a position proximate to a fixing hole 24a of the rotor core 24 to a position proximate to the permanent magnet 32. Each slit hole 46 is arranged at a position that corresponds to the central portion of the corresponding projection 33 in the circumferential direction. Each slit hole 46 extends in the radial direction from the position proximate to the fixing hole 24a of the rotor core 24 to the corresponding projection 33.

In each of the rotor parts 22a and 22b having such a structure, one half of each projection 33 in the circumferential direction divided by the corresponding slit hole 46 is configured as a N-magnet pseudo pole Fn, and the other half is configured as a S-magnet pseudo pole Fs. More specifically, the pseudo pole Fn of each projection 33 is adjacent to the S-magnet pole Ms (outer side of which is S-pole permanent magnet 32), and the field of the S-pole permanent magnet 32 causes the pseudo pole Fn to function as an N-pole magnet. In the same manner, the pseudo pole Fs of each projection 33 is adjacent to the N-magnet pole Mn (outer side of which is N-pole permanent magnet 32), and the field of the N-pole permanent magnet 32 causes the pseudo pole Fs to function as an S-pole magnet. Two N-magnet pseudo poles Fn are arranged in the circumferential direction at 180-degree opposing positions, and two S-magnet pseudo poles Fs are arranged in the circumferential direction at 180-degree opposing positions. First magnet pairs, each including the magnet poles Mn and Ms that are adjacent in the circumferential direction, and second magnet pairs, each including the pseudo magnets Fn and Fs that are adjacent in the circumferential direction, are alternately arranged at regular intervals (90°) in the circumferential direction. The first magnet pairs and the second magnet pairs are equal in number. This allows the structure of the rotor parts 22a and 22b to be mechanically well-balanced.

The slit holes 45 and 46 are gaps and have a larger magnetic resistance than the rotor core 24, which is formed from a magnetic metal. Thus, the slit holes 45 and 46 allow the flux of each permanent magnet 32 that passes through the rotor core 24 to be guided toward the adjacent pseudo magnet poles Fn and Fs in an optimal manner (refer to broken lines with arrowheads in FIG. 9).

In the structure of such rotor parts 22a and 22b, the pseudo magnet poles Fn and Fs (second magnet pole unit) apply a weaker magnetic force to the stator 11 than the magnet poles Mn and Ms (first magnet pole unit). Thus, a field weakening flux is easily generated at each winding 13. Accordingly, the effect of reducing the induced voltage resulting from the field weakening flux is obtained in a further optimal manner. As a result, the motor 10 is rotated at a higher speed in a further optimal manner. Further, vibration of the rotor 21 is limited in the same manner as the above embodiment by deviating the rotor parts 22a and 22b having the above structure from each other in the circumferential direction and arranging the rotor parts 22a and 22b next to each other in the axial direction.

In the rotors 22a and 22b having the structure shown in FIG. 9, it is preferred that the deviation angle θ of the rotor parts 22a and 22b in the circumferential direction be set to 360/(m×t)(°), where m represents the number of the rotors 22a and 22b arranged next to one another in the axial direction and t represents the number of pairs of the magnet poles Mn and Ms (the first magnet pairs) in each of the rotors 22a and 22b. This structure substantially obtains advantage (4) of the above embodiment. Further, in the structure shown in FIG. 9, the slit holes 46 may be extended to the outer circumferential surfaces of the projections 33 so that each projection 33 is divided into two in correspondence with the pseudo magnets Fn and Fs. In addition, the shape of each of the slits 45 and 46 is not limited to the example shown in FIG. 9 and may be changed in accordance with the structure.

Figure 10:
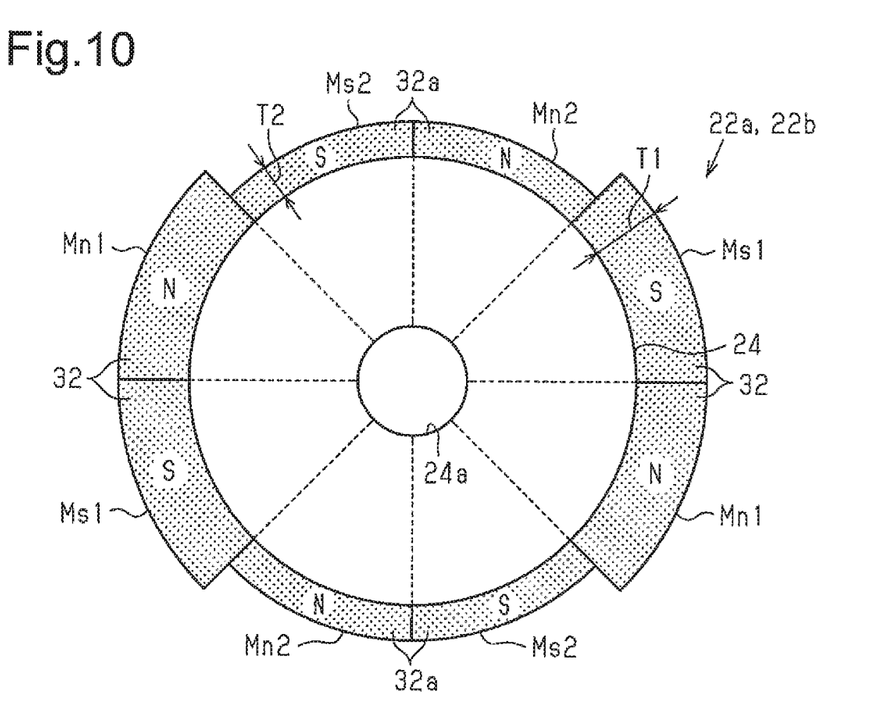
FIG. 10 is a plan view showing a further example of a rotor part.

FIG. 9 shows the structure including the pseudo magnets Fn and Fs formed by the projections 33 of the rotor core 24 as the second magnet pole unit, which have a weaker magnetic force than the magnet poles Mn and Ms. However, there is no such limitation. For example, FIG. 10 shows a structure in which each of the rotor parts 22a and 22b includes second magnet poles Mn2 and Ms2 (second magnet pole unit) including permanent magnets 32a having a weaker magnetic force than the permanent magnets 32, instead of the pseudo magnets Fn and Fs having the structure shown in FIG. 9. In the structure shown in FIG. 10, the magnet poles having the permanent magnets 32 are referred to as the first magnet poles Mn1 and Ms1 (first magnet pole unit).

As shown in FIG. 10, the radial thickness T2 of the permanent magnet 32a of each of the second magnet poles Mn2 and Ms2 is set to be smaller than the radial thickness T1 of the permanent magnet 32 of each of the first magnet poles Mn1 and Ms1. Thus, the magnetic force applied to the stator 11 by the rotor parts 22a and 22b is weaker at the second magnet poles Mn2 and Ms2 than at the first magnet poles Mn1 and Ms1. With such a structure, the effect of reducing the induced voltage resulting from the field weakening flux is also obtained in a further optimal manner. As a result, the motor 10 is rotated at a higher speed in a further optimal manner.

In the structure shown in FIG. 10, the permanent magnets 32 and 32a have different radial lengths such that the second magnet poles Mn2 and Ms2 produce a weaker magnet force than the first magnet poles Mn1 and Ms1. However, there is no such limitation. For example, the open angle of the permanent magnet 32a may be set to be smaller than the open angle of the permanent magnet 32 such that the second magnet poles Mn2 and Ms2 produce a weaker magnet force than the first magnet poles Mn1 and Ms1. Alternatively, for example, the same magnets may be used for the permanent magnets 32 and 32a and the permanent magnets 32a may be located inward in the radial direction from the permanent magnets 32 so that the second magnet poles Mn2 and Ms2 produce a weaker magnet force than the first magnet poles Mn1 and Ms1. As another option, for example, the permanent magnets 32a may have a smaller residual flux density than the permanent magnets 32 so that the second magnet poles Mn2 and Ms2 produce a weaker magnet force than the first magnet poles Mn1 and Ms1.

In the example described above, a structure including the second magnet pole unit (pseudo magnets Fn and Fs and second magnet poles Mn2 and Ms2) is applied to an SPM structure but may also be applied to the IPM structure shown in FIGS. 1B, 7, and 8.

In the above embodiment, the windings for each phase are connected in series. That is, the U-phase windings U1 to U4, the V-phase windings V1 to V4, and the W-phase windings W1 to W4 are connected in series. However, there is no such limitation, and the winding arrangement may be changed when required.

Figure 11:
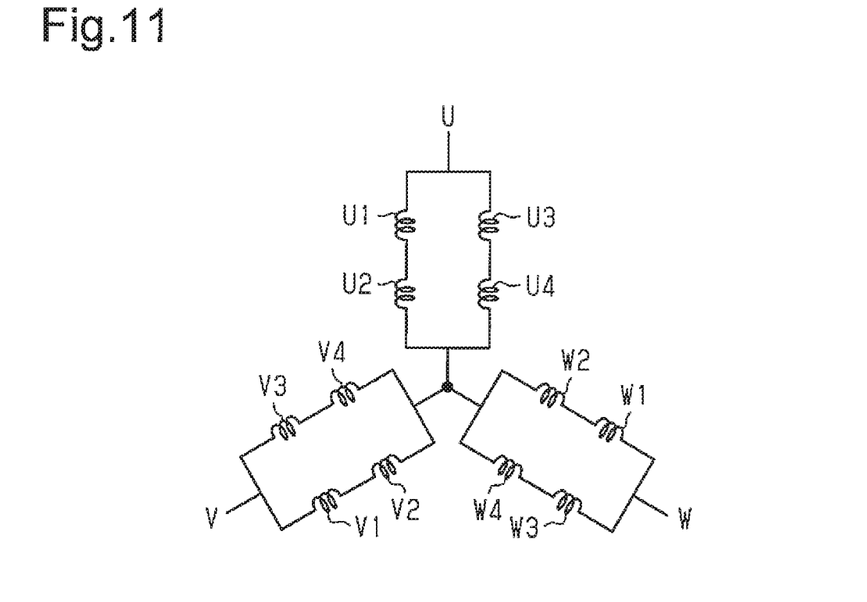
FIG. 11 is an electric circuit diagram showing the connection of windings shown in a further example.

For instance, in the example of FIG. 11, with regard to the U-phase, the windings U1 and U2 are connected in series, the windings U3 and U4 are connected in series, and the series-connected pair of the windings U1 and U2 is connected in parallel to the series-connected pair of the windings U3 and U4. In the same manner, with regard to the V-phase, the windings V1 and V2 are connected in series, the windings V3 and V4 are connected in series, and the series-connected pair of the windings V1 and V2 is connected in parallel to the series-connected pair of the windings V3 and V4. In the same manner, with regard to the W-phase, the windings W1 and W2 are connected in series, the windings W3 and W4 are connected in series, and the series-connected pair of the windings W1 and W2 is connected in parallel to the series-connected pair of the windings W3 and W4.

In the example of FIG. 11, with regard to the U-phase, the windings U1 and U2 configure a series-connected pair, and the windings U3 and U4 configure a series-connected pair. Instead, the windings U1 and U4 may configure a series-connected pair, and the windings U2 and U3 may configure a series-connected pair. Further, in the example of FIG. 11, with regard to the U-phase, the series-connected pair of the windings U1 and U2 is connected in parallel to the series-connected pair of the windings U3 and U4. Instead, the series-connected pair of the windings U1 and U2 can be separated from the series-connected pair of the windings U3 and U4, and a pair of inverters may be arranged to supply U-phase drive current to each of the separated series-connected pairs. Similar changes can be made to the V-phase and the W-phase. In the above embodiment (refer to FIG. 3) and the example of FIG. 11, the windings form a star connection. Instead, the windings may form, for example, a delta connection.

In the above embodiment, the total number of the magnet poles Mn and Ms in each of the rotor parts 22a and 22b is four, and the number (slot number) of the windings 13 of the stator 11 is twelve. However, the total number of the magnet poles Mn and Ms and the number of the windings 13 may be changed in accordance with the structure. For example, the total number of the magnet poles Mn and Ms in each of the rotor parts 22a and 22b and the number of the windings 13 may be changed so that the total number of the magnet poles Mn and Ms in each of the rotor parts 22a and 22b and the number of the windings 13 have a relationship of n:3n (where n is an integer of 2 or greater). When the total number of the magnet poles Mn and Ms in each of the rotor parts 22a and 22b is an even number like in the above embodiment, the number of magnet poles Mn can be the same as the number of magnet poles Ms. This allows for a structure that is well-balanced in magnetic terms.

Further, the total number of the magnet poles Mn and Ms in each of the rotor parts 22a and 22b and the number of the windings 13 does not necessarily have to be in a relationship of n:3n (where n is an integer of 2 or greater). For example, the total number of the magnet poles Mn and Ms in each of the rotor parts 22a and 22b and the number of the windings 13 may have a relationship of 5:12, 7:12, or the like.

Figure 12:
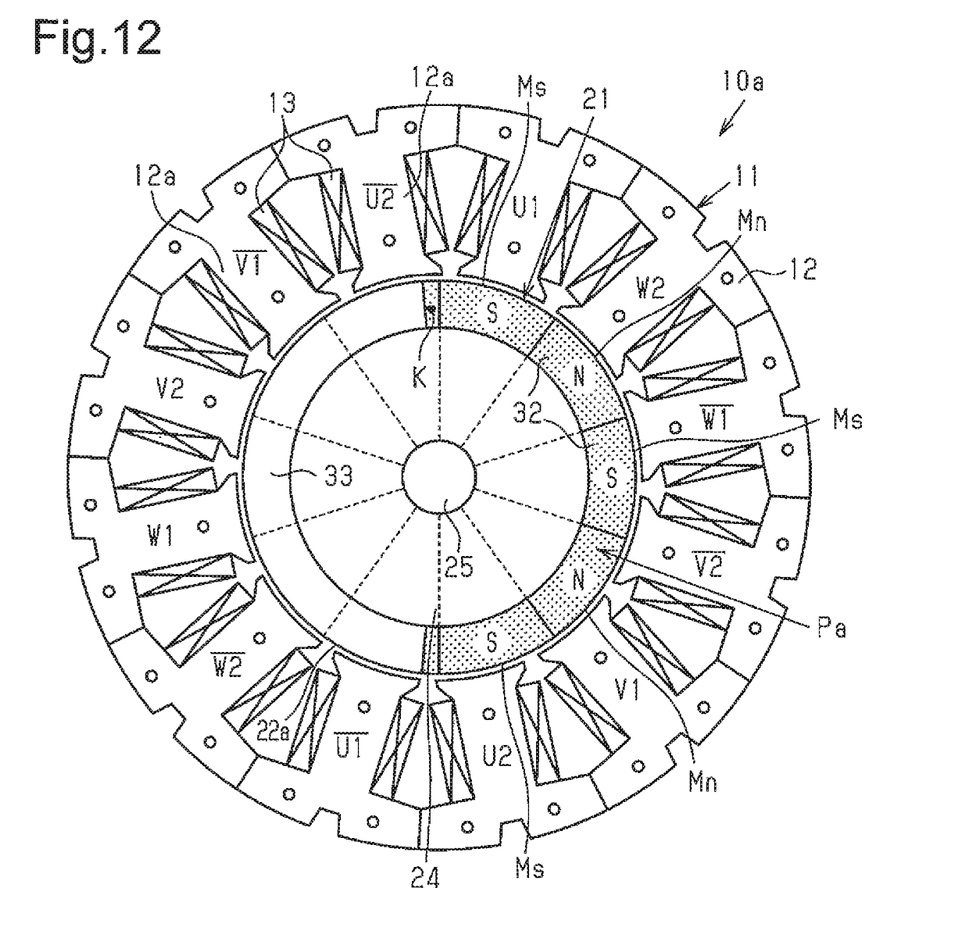
FIG. 12 is a plan view showing a further example of a motor.

FIG. 12 shows one example of a motor 10a in which the total number of the magnet poles Mn and Ms in each of the rotor parts 22a and 22b and the number of the windings 13 have a relationship of 5:1. In the example of FIG. 12, same reference numerals are given to those components that are the same as the corresponding components of the above embodiment and the above modified example. Such components will not be described in detail. The description hereafter will focus on differences from the above embodiment.

In the motor 10a shown in FIG. 12, the twelve windings 13 of the stator 11 are classified in accordance with the supplied drive currents of three phases (U-phase, V-phase, and W-phase) and indicated in FIG. 12 in order in the counterclockwise direction as U1, bar U2, bar V1, V2, W1, bar W2, bar U1, U2, V1, bar V2, bar W1, and W2. The U-phase windings U1 and U2, the V-phase windings V1 and V2, and the W-phase windings W1 and W2 are formed by forward windings. The U-phase windings bar U1 and bar U2, the V-phase winding bar V1 and bar V2, and the W-phase windings bar W1 and bar W2 are formed by reverse windings. The U-phase windings U1 and bar U1 are arranged at 180-degree opposing positions. In the same manner, the U-phase windings U2 and bar U2 are arranged at 180-degree opposing positions. The same applies to the other phases (V-phase and W-phase).

The U-phase windings U1, U2, bar U1, and bar U2 are connected in series. In the same manner, the V-phase windings V1, V2, bar V1, and bar V2 are connected in series, and the W-phase windings W1, W2, bar W1, and bar W2 are connected in series. The U-phase windings U1, U2, bar U1, bar U2 are supplied with a U-phase drive current. This constantly excites the U-phase windings bar U1 and bar U2, which are reverse windings, with an inverted polarity (inverted phase) with respect to the U-phase windings U1 and U2, which are forward windings. However, the excitation timing is the same. The same applies to the other phases (V-phase and W-phase). The windings of each phase are supplied with drive current that is set assuming that the pole number of the rotor 21 is two times the number of the magnet poles Mn and Ms (i.e., ten poles in the present example).

The outer circumferential portion of the rotor part 22a of the motor 10a includes a single pole set Pa, in which three magnet poles Ms and two magnet poles Mn are alternately arranged next to one another in the circumferential direction, and a single projection 33 of the rotor core 24.

The magnet poles Mn and Ms (permanent magnets 32) are set to have an equal open angle. Further, the open angle of the magnet poles Mn and Ms (permanent magnet 32) is set to $(360/2n)°$, where n represents the total number of the magnet poles Mn and Ms (number of permanent magnets 32). In the present example, the total number of the magnet poles Mn and Ms is five. Thus, the open angle of the magnet poles Mn and Ms (permanent magnet 32) is set to 36°, and the open angle of the pole set Pa is 180°.

More specifically, in the present example, one half of the outer circumference of the rotor 21 includes the pole set Pa, and the other half includes the projection 33 that is formed to have an open angle of substantially 180°. Thus, the rotor 21 is formed so that the projection 33 is located 180° opposite to the magnet poles Mn and Ms. The open angle of the projection 33 of the rotor core 24 is smaller than 180° by an amount corresponding to the gaps K extending from the magnet poles Ms (permanent magnets 32) that are adjacent in the circumferential direction.

The rotor 21 of the present example includes the first rotor part 22a, which has such a structure, and the second rotor part 22b (not shown), which has a structure similar to the first motor part 21a. The first rotor part 22a and the second rotor part 22b are arranged next to each other in the axial direction. The deviation angle of the rotor parts 22a and 22b in the circumferential direction is set to 180°. That is, in the rotor 21 of the present example, the magnet pole Pa of the first rotor part 22a and the projection of the second rotor part 22b are arranged next to each other in the axial direction, and the projection 33 of the first rotor part 22a and the magnet pole pair of the second rotor part 22b are arranged next to each other in the axial direction.

In the above structure of the motor 10a, during high-speed rotation of the rotor 21 (during field weakening control), for example, when the U-phase winding U1 is opposed in the radial direction to the S-magnet pole Ms, the projection 33 of the first rotor part 22a is opposed in the radial direction to the U-phase winding bar U1 (refer to FIG. 12) at the opposite side in the circumferential direction. That is, the magnet pole Ms and the projection 33 are simultaneously opposed to the U-phase windings U1 and bar U1 that are excited in inverted phases (synchronously). Further, in this state, in the second rotor part 22b, the S-magnet pole opposes the U-phase winding bar U1 and the projection opposes the U-phase winding U1.

The U-phase windings U1 and bar U1 are supplied with field weakening current, and the U-phase winding bar U1 radially opposes the projection 33 of the first rotor part 22a. This allows for smooth passage of the flux linkage (field weakening flux), which is generated at the U-phase winding bar U1 with field weakening current, through the rotor 21. In addition, the U-phase winding U1 radially opposes the projection of the second rotor part 22b. This allows for smooth passage of the field weakening flux, which is generated at the U-phase winding U1, through the rotor 21. Thus, the field weakening flux is easily generated at the U-phase windings U1 and bar U1. Accordingly, the effect of reducing the induced voltage (inverse voltage) resulting from the field weakening flux is obtained in a further optimal manner. Since the winding 13 in each phase has the same advantage, the motor 10 can be rotated at a higher speed in a further optimal manner.

The number of the magnet poles Mn and the number of the magnet poles Ms are not limited in the manner shown in the example of FIG. 12. For example, there may be three magnet poles Mn and two magnet poles Ms.

Figure 13:
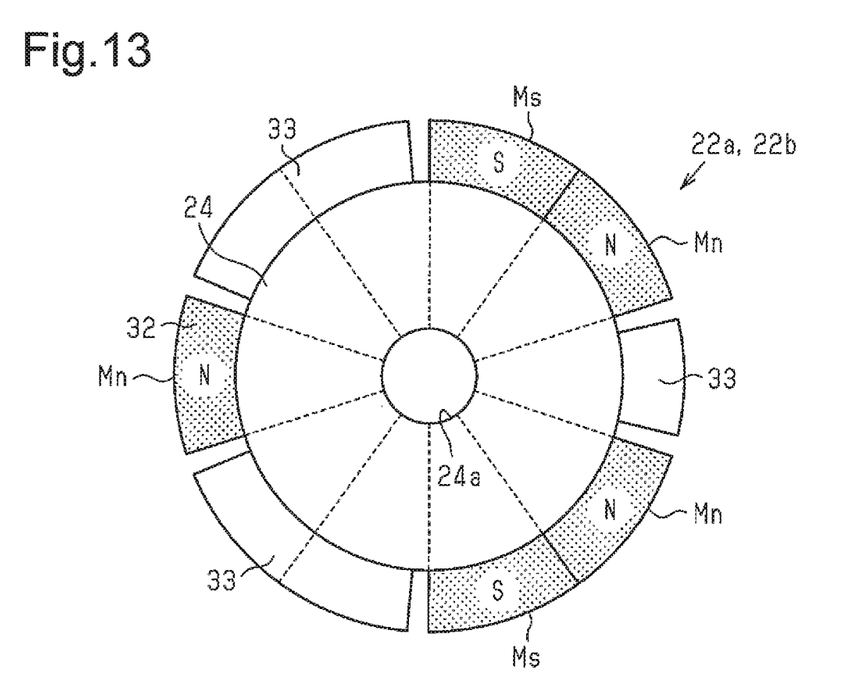
FIG. 13 is a plan view showing a further example of a rotor part.

Further, the arrangement of the magnet poles Mn and Ms and the projections 33 in each of the rotors 22a and 22b is not limited to the arrangement of the example shown in FIG. 12 and can be changed to the structure shown in, for example, FIG. 13 as long as the projection 33 is located at the circumferentially opposite side of the magnet poles Mn and Ms.

In the structure of FIG. 13, a projection 33 is formed in lieu of the middle magnet pole Ms in the pole set Pa of the structure shown in FIG. 12, and a magnet pole Mn (N-pole permanent magnet 32) is arranged at the circumferentially opposite side of the projection 33. This structure has the same advantages as the structure shown in FIG. 12. Further, in comparison with the structure shown in FIG. 12, each of the rotors 22a and 22b is well-balanced in magnetic and mechanical terms.

In the stator 11, the U-phase windings U1, U2, bar U1, and bar U2 do not all have to be connected in series. Further, the windings U1 and bar U1 may form a series-connected pair that is separate from the series-connected pair of the windings U2 and bar U2. The same changes may be made for the V-phase and the W-phase.

Further, FIG. 12 shows an example in which the total number of the magnet poles Mn and Ms and the number of the windings 13 have a 5:12 relationship. However, the present invention is also applicable to a structure having a 7:12 relationship. Further, the present invention is also applicable to a structure in which the total number of the magnet poles Mn and Ms and the number of the windings 13 in 5:12 (or 7:12) is multiplied by the same number.

In the above embodiment, the permanent magnets 23 are sintered magnets but instead may be, for example, bonded magnets.

In the above embodiment, the present invention is applied to an inner-rotor type motor 10 in which the rotor 21 is located at the inner circumferential side of the stator 11. Instead, the present invention may be applied to an outer-rotor type motor in which the rotor is located at the outer circumferential side of the stator.

In the above embodiment, the present invention is embodied in a radial-gap type motor 10 in which the stator 11 and the rotor 21 are opposed to each other in the radial direction. Instead, the present invention may be applied to an axial-gap type motor in which the stator and the rotor are opposed to each other in the axial direction.

The above embodiment and the modified examples may be combined with one another.

What is claimed is:
1. A motor comprising:
a stator including windings; and
a rotor rotated by a rotation field generated when drive currents are supplied to the windings,
wherein the windings include a first winding and a second winding connected in series, in which the first winding and the second winding are synchronously excited by the drive currents,
the rotor includes a plurality of rotor parts arranged next to each other in an axial direction,
each of the rotor parts includes
a magnet pole including a permanent magnet, and
a flux toleration portion opposing the second winding at a rotational position of the rotor where the magnet pole opposes the first winding, wherein the flux toleration portion tolerates generation of a flux linkage resulting from a field weakening current at the second winding,
wherein the rotor parts each include an equal number of magnet poles, and the magnet poles of the rotor parts are located at positions deviated from each other in a circumferential direction.
2. The motor according to claim 1, wherein
the magnet pole is one of a plurality of magnet poles, each of the rotor parts includes a plurality of magnet pole pairs arranged at equal intervals in the circumferential direction, and each of the magnet pole pairs includes an N-magnet pole and an S-magnet pole that are arranged adjacent to each other in the circumferential direction.

3. The motor according to claim 2, wherein the rotor parts are deviated from each other by 360/(m×t)(°) in the circumferential direction from one end of the rotor parts to another end of the rotor parts in the axial direction, where m represents the number of the rotors arranged next to each other in the axial direction and t represents the number of the magnet pole pairs of each of the rotor parts.

4. The motor according to claim 1, further comprising a non-magnetic layer located between the rotor parts.

5. A motor comprising:
a stator including windings; and
a rotor rotated by a rotation field generated when drive currents are supplied to the windings,
wherein the windings include a first winding and a second winding connected in series, in which the first winding and the second winding are synchronously excited by the drive currents,
the rotor includes a plurality of rotor parts arranged next to each other in an axial direction,
each of the rotor parts includes
a first magnet pole unit including a permanent magnet, and
a second magnet pole unit opposing the second winding at a rotational position of the rotor where the first magnet unit opposes the first winding, wherein the second magnet pole unit applies a weaker magnetic force to the stator than the first magnet pole unit, wherein the rotor parts each include an equal number of magnet poles, and
the first magnet pole units of the rotor parts are located at positions deviated from one another in a circumferential direction, and the second magnet pole units of the rotor parts are located at positions deviated from one another in the circumferential direction.

6. The motor according to claim 5, wherein
the first magnet pole unit is one of a plurality of first magnet pole units,
the second magnet pole unit is one of a plurality of second magnet pole units,
the rotor parts each include an equal number of first magnet pole pairs and second magnet pole pairs,
the first magnet pole pairs and the second magnet pole pairs are alternately arranged at equal intervals in the circumferential direction,
the first magnet pole pairs each include the first magnet pole unit of an N-pole and the first magnet pole unit of an S-pole that are arranged adjacent to each other in the circumferential direction, and
the second magnet pole pairs each include the second magnet pole unit of an N-pole and the second magnet pole unit of an S-pole that are arranged adjacent to each other in the circumferential direction.

7. The motor according to claim 6, wherein the rotor parts are deviated from each other by 360/(m×t)(°) in the circumferential direction from one end of the rotor parts to another end of the rotor parts in the axial direction, where m represents the number of the rotor parts arranged next to each other in the axial direction and t represents the number of the first magnet pole pairs of each of the rotor parts.

* * * * *